(12) United States Patent
Preisler et al.

(10) Patent No.: US 8,883,285 B2
(45) Date of Patent: Nov. 11, 2014

(54) SANDWICH-TYPE, COMPOSITE COMPONENT SUCH AS MOTOR VEHICLE COMPONENT AND UNITARY STRUCTURAL ASSEMBLY UTILIZING SAME

(71) Applicant: Global IP Holdings, LLC, Sterling Heights, MI (US)

(72) Inventors: Darius J. Preisler, Macomb, MI (US); Christopher A. Heikkila, Washington Township, MI (US)

(73) Assignee: Global IP Holdings, LLC, Sterling Heights, MI (US)

( * ) Notice: Subject to any disclaimer, the term of this patent is extended or adjusted under 35 U.S.C. 154(b) by 48 days.

(21) Appl. No.: 13/687,232

(22) Filed: Nov. 28, 2012

(65) Prior Publication Data

US 2013/0280469 A1 Oct. 24, 2013

Related U.S. Application Data

(63) Continuation-in-part of application No. 13/453,269, filed on Apr. 23, 2012, now Pat. No. 8,795,465, and a continuation-in-part of application No. 13/603,522, filed on Sep. 5, 2012.

(51) Int. Cl.
*B32B 3/04* (2006.01)
*B32B 3/12* (2006.01)

(52) U.S. Cl.
CPC .... *B32B 3/04* (2013.01); *B32B 3/12* (2013.01)
USPC .......... 428/99; 296/39.1; 296/39.2; 296/39.3; 428/95; 428/98; 428/116

(58) Field of Classification Search
CPC .......... A47G 27/02; B29C 43/00; B32B 3/02; B32B 3/04; B32B 3/12; B32B 3/263; B60R 5/00; B60R 5/04; B60R 13/00; B60R 13/011; B62D 25/20
USPC .............. 428/95, 98, 99, 116; 296/39.1, 39.2, 296/39.3, 97.23
See application file for complete search history.

(56) References Cited

U.S. PATENT DOCUMENTS

| 5,298,694 | A | 3/1994 | Thompson et al. |
| 5,502,930 | A | 4/1996 | Burkette et al. |
| 5,915,445 | A | 6/1999 | Rauenbusch |
| 5,979,962 | A | 11/1999 | Balentin et al. |
| 6,050,630 | A | 4/2000 | Hochet |

(Continued)

OTHER PUBLICATIONS

Office Action; related U.S. Appl. No. 13/479,974; date of mailing Mar. 20, 2014.

(Continued)

*Primary Examiner* — Brent O'Hern
(74) *Attorney, Agent, or Firm* — Brooks Kushman P.C.

(57) ABSTRACT

A sandwich-type, composite component such as a motor vehicle component and unitary structural assembly utilizing same are provided. The component has a sealed, moisture-resistant, A-surface edge. The component includes a first outer layer having an A-surface, a second outer layer having a B-surface and a core positioned between the outer layers. The core has a large number of cavities. The outer layers are bonded to the core by press molding. An edge portion of the component is locally crushed by the press molding so that the layers are bonded together to form the sealed, moisture-resistant, A-surface edge.

20 Claims, 3 Drawing Sheets

(56) References Cited

U.S. PATENT DOCUMENTS

| | | | |
|---|---|---|---|
| 6,102,464 | A | 8/2000 | Schneider et al. |
| 6,435,577 | B1 | 8/2002 | Renault |
| 6,537,413 | B1 | 3/2003 | Hochet et al. |
| 6,631,785 | B2 | 10/2003 | Khambete et al. |
| 6,655,299 | B2 | 12/2003 | Preisler et al. |
| 6,659,223 | B2 | 12/2003 | Allison et al. |
| 6,682,675 | B1 | 1/2004 | Vandangeot et al. |
| 6,682,676 | B1 | 1/2004 | Renault et al. |
| 6,748,876 | B2 | 6/2004 | Preisler et al. |
| 6,790,026 | B2 | 9/2004 | Vandangeot et al. |
| 6,793,747 | B2 | 9/2004 | North et al. |
| 6,823,803 | B2 | 11/2004 | Preisler |
| 6,843,525 | B2 | 1/2005 | Preisler |
| 6,890,023 | B2 | 5/2005 | Preisler et al. |
| 6,981,863 | B2 | 1/2006 | Renault et al. |
| 7,014,259 | B2 | 3/2006 | Heholt |
| 7,090,274 | B1 | 8/2006 | Khan et al. |
| 7,093,879 | B2 | 8/2006 | Putt et al. |
| 7,264,685 | B2 | 9/2007 | Katz et al. |
| 7,320,739 | B2 | 1/2008 | Thompson, Jr. et al. |
| 7,402,537 | B1 | 7/2008 | Lenda et al. |
| 7,419,713 | B2 | 9/2008 | Wilkens et al. |
| 7,837,009 | B2 | 11/2010 | Gross et al. |
| 7,909,379 | B2 | 3/2011 | Winget et al. |
| 7,918,313 | B2 | 4/2011 | Gross et al. |
| 7,919,031 | B2 | 4/2011 | Winget et al. |
| 8,117,972 | B2 | 2/2012 | Winget et al. |
| 8,622,456 | B2 | 1/2014 | Preisler et al. |
| 8,690,233 | B2 | 4/2014 | Preisler et al. |
| 2003/0079659 | A1* | 5/2003 | Preisler et al. ............... 108/51.3 |
| 2005/0189674 | A1 | 9/2005 | Hochet et al. |
| 2006/0255611 | A1 | 11/2006 | Smith et al. |
| 2008/0185866 | A1 | 8/2008 | Tarrant et al. |
| 2010/0026031 | A1* | 2/2010 | Jouraku ..................... 296/37.16 |
| 2011/0315310 | A1 | 12/2011 | Trevisan et al. |
| 2013/0278002 | A1 | 10/2013 | Preisler et al. |
| 2013/0278003 | A1 | 10/2013 | Preisler et al. |
| 2013/0278009 | A1 | 10/2013 | Preisler et al. |
| 2013/0278015 | A1 | 10/2013 | Preisler et al. |
| 2013/0278018 | A1 | 10/2013 | Preisler et al. |
| 2013/0278019 | A1 | 10/2013 | Preisler et al. |
| 2013/0278020 | A1 | 10/2013 | Preisler et al. |
| 2013/0280469 | A1 | 10/2013 | Preisler et al. |
| 2013/0280472 | A1 | 10/2013 | Preisler et al. |
| 2013/0280473 | A1 | 10/2013 | Preisler et al. |
| 2013/0312652 | A1 | 11/2013 | Preisler et al. |
| 2013/0316123 | A1 | 11/2013 | Preisler et al. |
| 2014/0077518 | A1 | 3/2014 | Preisler et al. |
| 2014/0077530 | A1 | 3/2014 | Preisler et al. |
| 2014/0077531 | A1 | 3/2014 | Preisler et al. |
| 2014/0145465 | A1 | 5/2014 | Preisler et al. |
| 2014/0145470 | A1 | 5/2014 | Preisler et al. |
| 2014/0147617 | A1 | 5/2014 | Preisler et al. |
| 2014/0147622 | A1 | 5/2014 | Preisler et al. |

OTHER PUBLICATIONS

Office Action; related U.S. Appl. No. 13/686,362; date of mailing Mar. 25, 2014.
Office Action; related U.S. Appl. No. 13/523,253; date of mailing Mar. 25, 2014.
Office Action; related U.S. Appl. No. 13/688,972; date of mailing Mar. 28, 2014.
Office Action; related U.S. Appl. No. 13/687,232; date of mailing Mar. 28, 2014.
Office Action; related U.S. Appl. No. 13/689,809; date of mailing Mar. 31, 2014.
Office Action; related U.S. Appl. No. 13/687,213; date of mailing Mar. 31, 2014.
Office Action; related U.S. Appl. No. 13/690,265; date of mailing Mar. 31, 2014.
Office Action; related U.S. Appl. No. 13/762,904; date of mailing Apr. 8, 2014.
Office Action; related U.S. Appl. No. 13/762,800; date of mailing Apr. 8, 2014.
Office Action; related U.S. Appl. No. 13/762,861; date of mailing Apr. 9, 2014.
Office Action; related U.S. Appl. No. 13/690,566; date of mailing Apr. 9, 2014.
Office Action; related U.S. Appl. No. 13/762,832; date of mailing Apr. 11, 2014.
Office Action; related U.S. Appl. No. 13/762,921; date of mailing Apr. 14, 2014.
Notice of Allowance; related U.S. Appl. No. 13/686,388; date of mailing Apr. 15, 2014.
Related U.S. Appl. No. 13/690,566, filed Nov. 30, 2012.
Related U.S. Appl. No. 13/762,921, filed Feb. 8, 2013.
Related U.S. Appl. No. 13/762,956, filed Feb. 8, 2013.
Office Action; related U.S. Appl. No. 13/453,201 (now USPN 8,690,233); date of mailing Nov. 20, 2013.
Office Action; related U.S. Appl. No. 13/523,209 (now USPN 8,622,456) date of mailing Apr. 29, 2013.

* cited by examiner

SANDWICH-TYPE, COMPOSITE COMPONENT SUCH AS MOTOR VEHICLE COMPONENT AND UNITARY STRUCTURAL ASSEMBLY UTILIZING SAME

CROSS-REFERENCE TO RELATED APPLICATIONS

This application is a continuation-in-part application of both U.S. patent application entitled "Method of Making a Sandwich-Type Composite Panel Having a Living Hinge and Panel Obtained by Performing the Method" filed Apr. 23, 2012 and having U.S. Ser. No. 13/453,269 and U.S. patent application entitled "Assembly Including a Compression-Molded, Composite Panel With a Hinged Mounting Flange" filed Sep. 5, 2012 and having U.S. Ser. No. 13/603,552. This Application also claims the benefit, if any, of U.S. patent application Ser. Nos. 13/686,362 filed Nov. 27, 2012 (now U.S. Pat. No. 8,808,828); 13/690,265 filed Nov. 30, 2012 (now U.S. Pat. No. 8,808,831); 13/762,956 filed Feb. 8, 2013; 13/762,921 filed Feb. 8, 2013 (now U.S. Pat. No. 8,834,985); and 13/762,861 filed Feb. 8, 2013 (now U.S. Pat. No. 8,808,835).

TECHNICAL FIELD

This invention relates, in general, to the field of compression-molded, composite panels or components and, in particular, to sandwich-type composite components or panels having sealed, moisture-resistant, A-surface edges.

Overview

The term "facing material" refers to a material used to conceal and/or protect structural and/or functional elements from an observer. Common examples of facing materials include upholstery, carpeting, and wall coverings (including stationary and/or movable wall coverings and cubicle wall coverings). Facing materials typically provide a degree of aesthetic appearance and/or feel, but they may also provide a degree of physical protection to the elements that they conceal. In some applications, it is desirable that the facing material provide properties such as, for example, aesthetic appeal (for example, visual appearance and/or feel) and abrasion resistance.

Facing materials are widely used in motor vehicle construction. In the automotive industry, it is common practice to refer to various surfaces as being A-, B-, or C-surfaces.

As used herein, the term "A-surface" refers to an outwardly-facing surface for display in the interior of a motor vehicle. This surface is a very high visibility surface of the vehicle that is most important to the observer or that is most obvious to the direct line of vision. With respect to motor vehicle interiors, examples include dashboards, instrument panels, steering wheels, head rests, upper seat portions, headliners, load floors and pillar coverings.

Sandwich-type composite panels including cores have very important characteristics because of their light weight and high strength. Conventionally, such panels are constructed by sandwiching a core having a large number of cavities and having low strength characteristics between two outer layers or skins, each of which is much thinner than the core but has excellent mechanical characteristics.

The prior art discloses a method of making a panel of sandwich-type composite structure having a cellular core in a single processing step. In that method, the panel is made by subjecting a stack of layers of material to cold-pressing in a mold. The stack is made up of: at least a first skin made of a reinforced thermoplastics material, a cellular core made of a thermoplastics material, and a second skin also made of a reinforced thermoplastics material. The stack may also include one or more external covering layers made of a facing material such as woven or nonwoven thermoplastic material. The skins may be pre-heated outside the mold or heated inside the mold to a softening temperature.

Such a method is particularly advantageous because of the fact that it makes it possible, in a single operation, to generate cohesion and bonding between the various layers of the composite structure, and to shape the resulting panel while preserving all of the mechanical properties imparted by the cellular-core, sandwich structure.

Panels of sandwich-type composite structure having a cellular core have rigidity characteristics sufficient to enable mechanical structures subjected to large stresses to be reinforced structurally without making them too heavy. Such panels are in common use in shipbuilding, aircraft construction, and rail vehicle construction.

Open edges on sandwich panels can be closed-off and sealed with edge fillers, extrusions, epoxy potting or tape to prevent moisture ingress, to enhance appearance or permit subsequent fixings. Moisture absorption may result in increased weight and performance degradation over a prolonged time period. Such degradation may be further hastened by impact and wear. Such degradation may prevent usage of conventional composite sandwich panels in maintenance and high wear areas of a vehicle.

Edge closures such as edge fillers, extrusions, epoxy potting or tape, however, are fixed to the sandwich-structure composite panels in a separate and subsequent operation, after the panels have been formed as shown in U.S. Pat. No. 8,117,972. That subsequent operation requires an additional workstation, be it automated or otherwise, which increases, in particular, the manufacturing time and cost of the finished parts.

In addition, separate edge closures mounted on a composite panel of the sandwich-type are a source of quality defects, and thus adds to the cost of making such panels. Imperfections or damage to such edge closures may degrade the aesthetic appearance of the panels or components as well as the functional requirements of the panels or components.

The following additional U.S. patent documents are also related to the present invention: U.S. Pat. Nos. 6,050,630; 6,435,577; 6,537,413; 6,655,299; 6,682,675; 6,682,676; 6,748,876; 6,790,026; 6,823,803; 6,843,525; 6,890,023; 6,981,863; 7,419,713; 7,909,379; 7,919,031; 2005/0189674, and 2011/0315310.

SUMMARY OF EXAMPLE EMBODIMENTS

An object of at least one embodiment of the present invention is to provide a sandwich-type, composite component such as a motor vehicle component, and assembly utilizing same wherein the component has a sealed, moisture-resistant, A-surface edge where water absorption and freeze-thaw cycle, may otherwise be problematic.

Another object of at least one embodiment of the present invention is to provide a sandwich-type composite component having a sealed, moisture-resistant, A-surface edge without the need for a separate edge closure.

In carrying out the above objects and other objects of at least one embodiment of the present invention, a sandwich-type, composite component having a sealed, moisture-resistant, A-surface edge is provided. The component includes a first outer layer having an A-surface, a second outer layer having a B-surface and a core positioned between the outer layers. The core has a large number of cavities. The outer layers are bonded to the core by press molding. An edge portion of the component is locally crushed by the press molding so that the layers are bonded together to form the sealed, moisture-resistant, A-surface edge.

The component may have a thickness in a range of 5 to 25 mm.

The layers may be chemically bonded together at the periphery of the component to hermetically seal the A-surface edge.

At least one of the layers may be a woven layer.

An end face of one of the layers may be bonded to the other layer.

The layers may be reinforced thermoplastic layers such as fiber reinforced layers.

The core may be a cellular core such as a honeycomb core.

The core may be a thermoplastic core wherein the thermoplastic of the layers and the core may be polypropylene.

Further in carrying out the above objects and other objects of at least one embodiment of the invention, a unitary structural assembly is provided. The assembly includes a first component having a bottom layer and an outer peripheral side wall. The assembly also includes a sandwich-type, composite panel having a sealed, moisture-resistant, A-surface edge. The panel has a first outer layer bonded to a lower surface of the bottom layer, a second outer layer and a core positioned between the outer layers. The core has a large number of cavities. The outer layers are bonded to the core by press molding. An edge portion of the panel is locally crushed by the press molding so that the outer layers are bonded together to form the sealed, moisture-resistant, A-surface edge.

The outer layers may be chemically bonded together at the periphery of the panel to hermetically seal the A-surface edge.

An end face of one of the outer layers may be bonded to the other outer layer.

The side wall of the component may be hollow. The layers may be chemically bonded together at the periphery of the panel to hermetically seal the A-surface edge.

The core may be a cellular core such as a honeycomb core.

The layers may be reinforced thermoplastic layers such as fiber reinforced layers.

The core may be a thermoplastic core wherein the thermoplastic of the layers and the core may be polypropylene.

The panel may have a thickness in the range of 5 to 25 mm.

At least one of the layers may be woven layer.

Still further in carrying out the above objects and other objects of at least one embodiment of the invention a sandwich-type, composite motor vehicle component having a sealed, moisture-resistant, A-surface edge is provided. The component includes a first reinforced thermoplastic skin having an A-surface to display in the interior of the vehicle. The component also includes a second reinforced thermoplastic skin having a B-surface and a thermoplastic cellular core positioned between the skins. The core has a large number of cavities. The skins are bonded to the core by press molding. An edge portion of the component is locally crushed by the press molding so that the skins are bonded together to form the sealed, moisture-resistant, A-surface edge for display in the interior of the vehicle.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
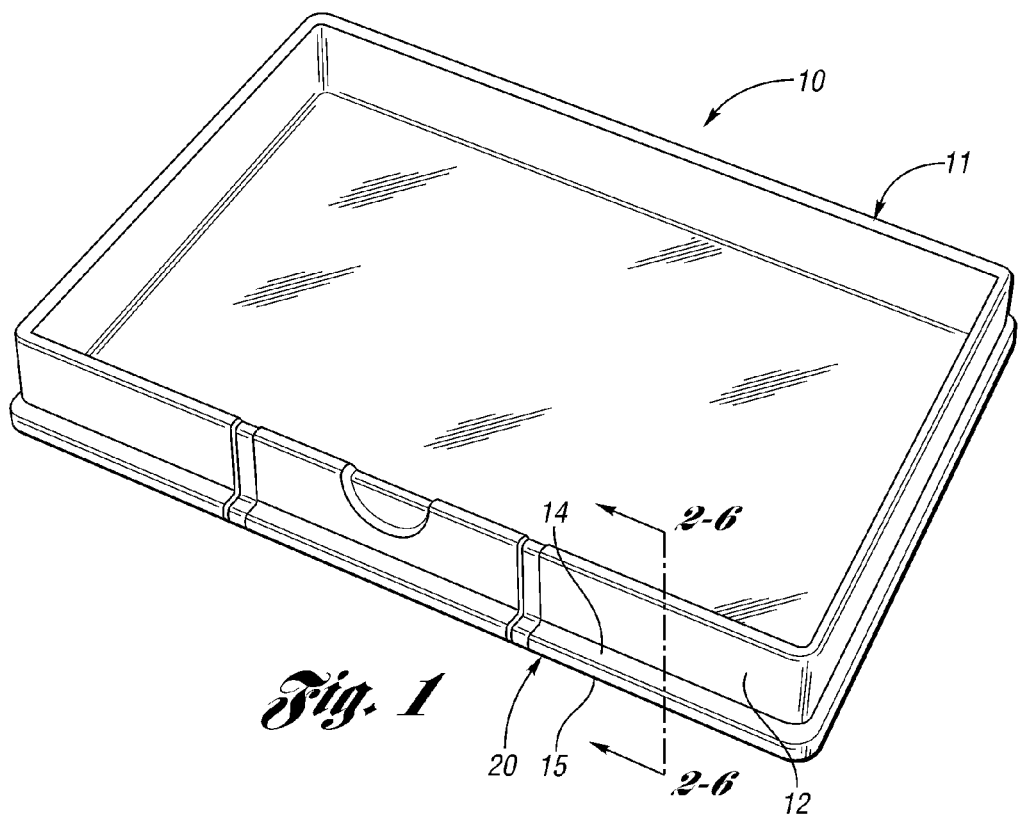
FIG. 1 is a top perspective view of a unitary structural assembly in the form of a shelf or floor for use in the interior of a passenger vehicle and constructed in accordance with at least one embodiment of the present invention.
Figures 2, 3, 4:
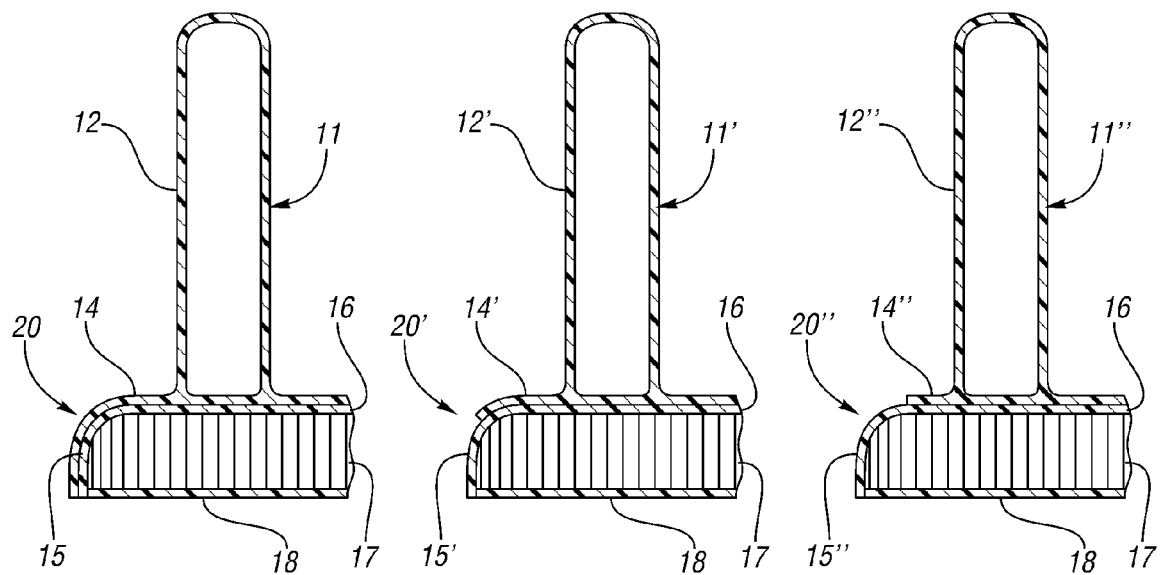
FIGS. 2-6 are views, partially broken away and in cross section, taken along lines 2-6 and 2-6 of FIG. 1 and illustrating different embodiments of the present invention.

Referring now to FIGS. 1 and 2, there is shown a unitary structural assembly, generally indicated at 10. The assembly 10 may be an automotive interior plastic part such as a shelf or floor panel. The assembly 10 includes a plastic component, generally indicated at 11. The component 11 has a bottom layer 14 and a hollow, outer peripheral side wall 12.

The assembly 10 also includes a sandwich-type, composite panel, generally indicated at 20, having a moisture-resistant, A-surface edge 15. The panel 20 includes a first outer layer 16 bonded to a lower surface of the bottom layer 14 of the component 11, a second outer layer 18 and a core 17 positioned between the outer layers 16 and 18 and having a large number of cavities. The outer layers 16 and 18 are bonded to the core 17 by press molding. An edge portion of the panel 20 is locally crushed by the press molding so that the outer layers 16 and 18 are bonded together to form the sealed, moisture-resistant, A-surface edge 15.

The outer layers 16 and 18 are preferably chemically bonded together at the periphery of the panel 20 to hermetically seal the A-surface edge 15.

An end face of the outer layer 18 is bonded to the other layer 16 as shown in FIGS. 2-4.

FIGS. 3-6 shows different embodiments of the assembly 10 including different components as indicated by reference numerals 12', 12", 12"' and 12"", respectively The same or similar component in each of the embodiments which have the same or similar structure and/or function have the same reference number but a different prime designation. The bottom layer 14 of component 11 (FIGS. 1 and 2) curves through an angle of about 90° to a lower surface of the assembly 10. However, the bottom layer 14' of FIG. 3 only curves through an angle of about 45° to a position above the core 17. The bottom layer 14" of the component 11" in FIG. 4 does not curve at all. However, common to each of the embodiments of FIGS. 2-4 is that the outer layers 16 and 18 are bonded together via press molding to form a sealed, moisture resistant, A-surface edge 15, 15' and 15", respectively.

Figure 5:
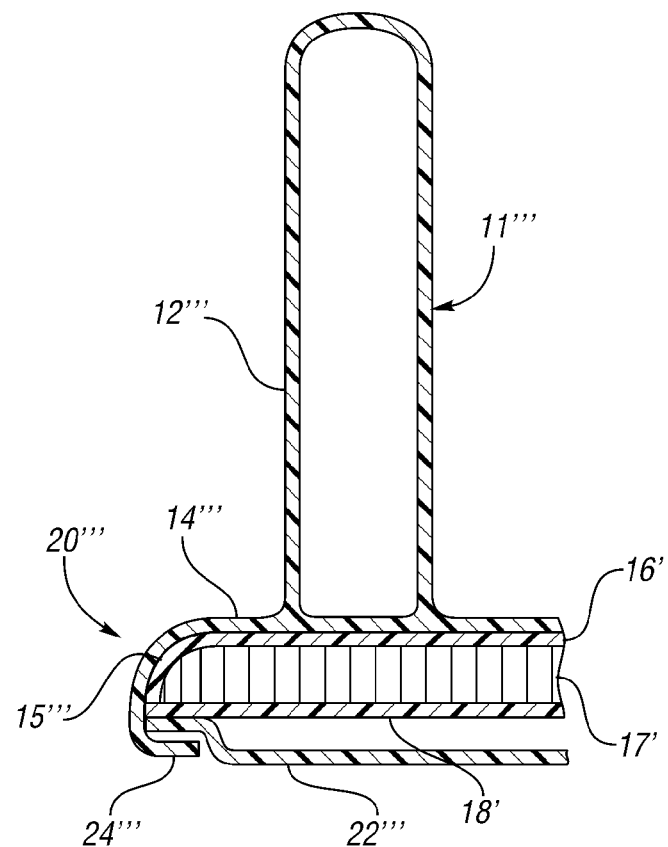

Referring now to FIG. 5, a different embodiment of the assembly 10 is shown and includes a component 11' having a bottom layer 14''' which curves about and over an A-surface edge 15''' of the component 20'''. A lip portion 24''' of the layer 14''' extends under a lower surface of an outer layer 18' of the component 20'''. The bottom layer 14''' helps to form the A-surface edge 15''' of the assembly 10. Another plastic layer 22''' which may be integrally formed with the bottom layer 14''' extends to a position between the lip portion 24''' and the bottom layer 18' to further provide a moisture-resistant, hermetically sealed, A-surface edge 15'''.

Figure 6:
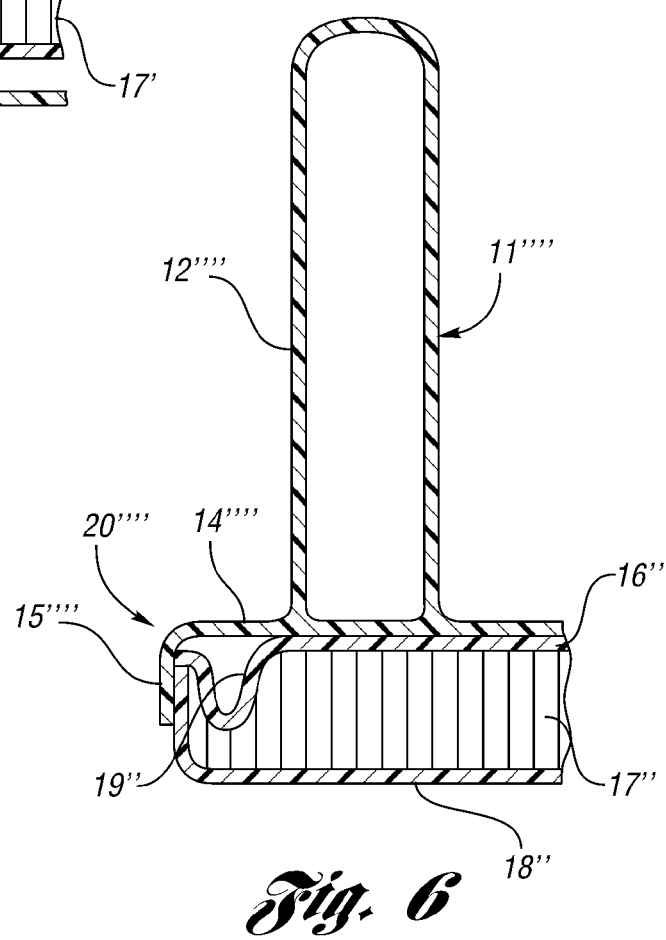

Referring now to FIG. 6, yet another embodiment of the assembly 10 is shown. An outer layer 16" of the component 20'''' has a depression 19" formed therein such as by press molding so that an outer face of the outer layer 18" is bonded and hermetically sealed to the outer layer 16". The bottom layer 14'''' of the component 11'''' helps to seal the resulting A-surface edge 15''''.

Referring now to FIGS. 7-10 there are illustrated yet additional embodiments of various resulting sealed, moisture-resistant, A-surface edges 30a, 30b, 30c and 30d constructed in accordance with the present invention. The parts or portions of FIGS. 7-10 which are the same or similar to the parts or portions of the embodiments of FIGS. 1-6 have the same reference number (except for the A-surface edges 30a, 30b, 30c and 30d) but have an "a", "b", "c" or "d" suffix.

Figure 7:
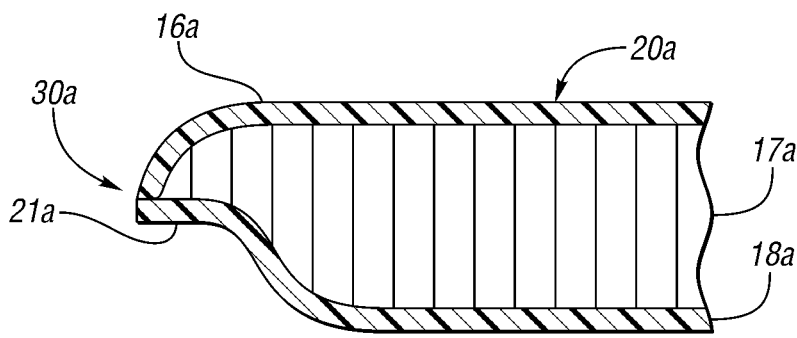
FIG. 7 is a view, partially broken away and in cross section, of a sandwich-type, composite component constructed in accordance with one embodiment of the present invention.

For example, in FIG. 7, a sandwich-type, composite panel, generally indicated at 20a, has outer layers 16a and 18a which are bonded to a core 17a during press molding. During press molding, a depression 21a is formed by locally crushing an edge portion of the panel 20a to bond an end face of the outer layer 16a to the outer layer 16a and form a sealed, moisture-resistant, A-surface edge 30a. The outer layer 16a is also curved during the press molding.

Figure 8:
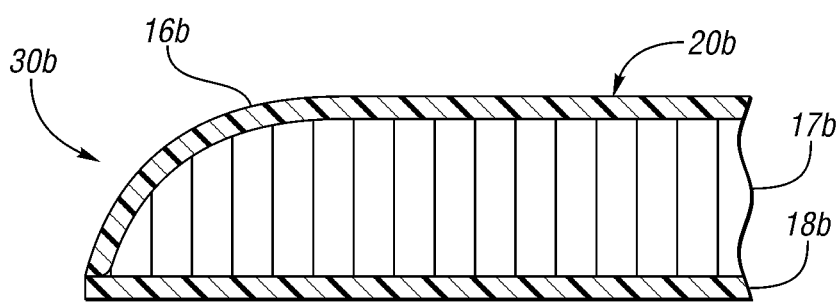
FIG. 8 is a view, similar to the view of FIG. 7, of another embodiment.

In FIG. 8, outer layer 16b is curved during the press molding to bond the end face of the outer layer 16b and the outer layer 18b together and form the sealed, moisture-resistant, A-surface edge 30b.

Figure 9:
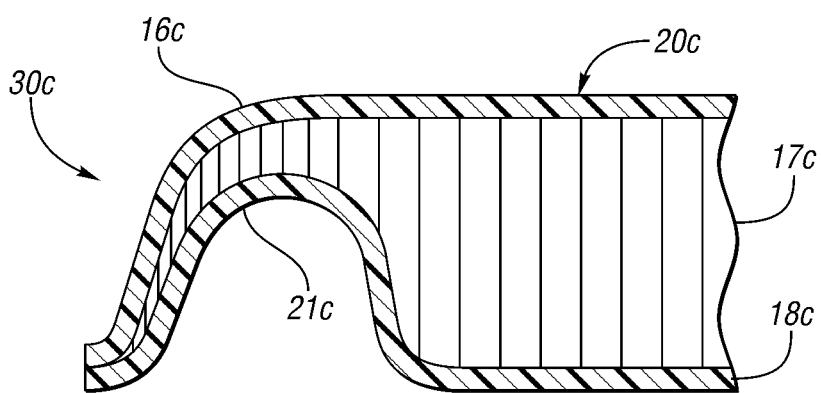
FIG. 9 is a view, similar to the views of FIGS. 7 and 8, of yet another embodiment.

In FIG. 9, outer layer 16c is curved first in one direction and then in the opposite direction to bond the outer layer 16c to the outer layer 18c during press molding. During press molding, a depression 21c is also formed by locally crushing the edge portion of the panel 20c. In this way, yet another sealed, moisture-resistant, A-surface edge 30c is formed.

Figure 10:
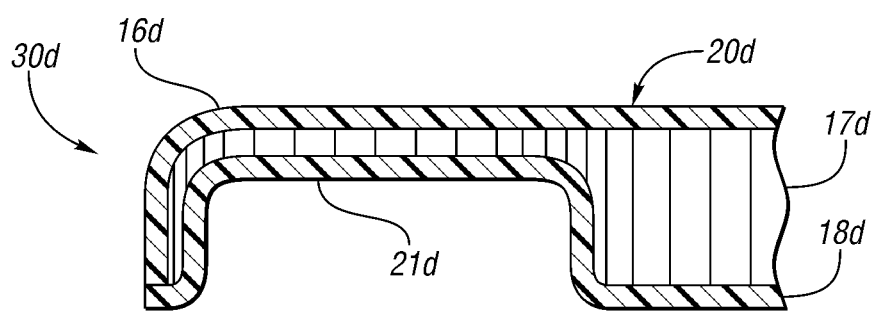
FIG. 10 is a view, similar to the views of FIGS. 7-9, of still another embodiment.

In FIG. 10, outer layer 16d is curved downwardly approximately 90° so that an end face of the layer 16d is bonded to outer layer 18d which has a depression 21d formed therein during the press molding. The edge portion of the panel 20d is locally crushed during the press molding, as in the other embodiments, to form a sealed, moisture-resistant, A-surface edge 30d.

A method of locally crushing and making the different components or panels 20, 20', 20", 20''', 20'''', 20a, 20b, 20c and 20d is described in the above noted application entitled "Method of Making a Sandwich-Type Composite Panel Having a Living Hinge and Panel Obtained by Performing the Method". While only the making of the panel or component 20 is described below, it is to be understood the other components or panels are made in the same fashion.

The method may include providing a stack of material, located or positioned within a mold. The stack includes reinforced thermoplastic skins (which form the outer layers), a thermoplastic cellular core disposed between the skins and a covering layer of thermoplastics material which covers the top skin in the form of the component 11. The skins are heated typically outside of the mold to a softening temperature. The mold is preferably a low pressure compression mold which performs a thermo compression process on the stack. The mold has an upper mold half or part and a lower mold half or part. The upper mold part has at least one protrusion extending towards the lower mold half for crushing purposes as described above and in detail below.

The first skin is stretchable when heated to the softening temperature and stretches when a pressure is applied to the stack by the inner mold surfaces of the mold halves and including the outer surface of the protrusion within the mold to form the composite panel 20 with the A-surface edge 20. An outer peripheral edge portion of the composite panel is crushed at one or more predetermined locations simultaneously with the step of applying the pressure to locally compact the cellular core 17 at the predetermined location(s) to form the A-surface edge 15 of the panel. The first skin stretches and curves during the step of crushing. The first and second skins 16 and 18 of the crushed portion are chemically bonded together to form the hermetically sealed, A-surface edge 15 at the predetermined location.

As previously mentioned, the stack of material may also preferably include the thermoplastic covering layer which forms the component 11 for covering one of the outer skins when making an assembly, such as the assembly 10. As shown in FIG. 5, the stack may also include a second thermoplastic covering layer 22''' for at least partially covering the skin 18' so that the resulting panel 20" is completely covered at its top and bottom surfaces.

The covering 14''' and 22''' may be a resin such as polypropylene. One side or both sides of the panel 20''' may be covered with a layer, such as an outer covering layer.

The cellular core 17 may be a honeycomb core. In this example, the cellular core 17 is an open-celled structure of the type made up of tubes or of a honeycomb, and it is made mainly of polyolefin and preferably of polypropylene. It is also possible to use a cellular structure having closed cells of the foam type.

Each of the skins 16 and 18 may be fiber reinforced. The thermoplastic of the skins 16 and 18, one or more covering layers and the core 17 may be polypropylene. At least one of the skins 16 and 18 may be a woven skin, such as polypropylene skin. The first and second skins 16 and 18 may be reinforced with fibers, e.g., glass fibers, carbon fibers or natural fibers. The first and second skins 16 and 18 may advantageously be made up of woven glass fiber fabric and of a thermoplastics material.

The resulting panel 20 may have a thickness in the range of 5 to 25 mm and the crushed portion of the panel 20 may have a thickness less than 3 mm such as 2 mm or less.

In one example method of making such a panel, the panel 20 is formed by pressing the stack of material in the low-pressure, cold-forming mold, the stack being made up of the first skin 16, the cellular core 17, and the second skin 18. The stack may be pressed at a pressure lying in the range $10 \times 10^5$ Pa. to $30 \times 10^5$ Pa. The first and second skins 16 and 18 are preferably pre-heated in the method to make them malleable and stretchable. Advantageously, in order to soften the first and second skins, heat is applied to a pre-assembly constituted by the stack made up of at least the first skin 16, of the cellular core 17, and of the second skin 18 so that, while the panel 20 is being formed in the mold, the first and second skins 16 and 18 have a forming temperature lying approximately in the range of 160° C. to 200° C., and, in this example, about 180° C.

The protrusion of the mold may have a variety of shapes in cross section in order for the mold to perform a crushing step during the pressure application step to form a variety of depressions and A-surface edges.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. An assembly comprising:
    a component having a bottom layer and an outer peripheral side wall; and
    a sandwich-type, composite component having a sealed, moisture-resistant, A-surface edge, the component including:
        a first outer layer having an A-surface;
        a second outer layer having a B-surface; and
        a core positioned between the first outer layer and the second outer layer and having a plurality of cavities wherein the outer layers are bonded to the core by press molding, and wherein an outer peripheral edge portion of the component is locally crushed by the press molding so that the first outer layer and the second out layer are bonded together to form the sealed, moisture-resistant, A-surface edge and wherein the outer peripheral side wall is spaced inwardly from the outer peripheral edge portion.

2. The component as claimed in claim 1, wherein the layers are chemically bonded together at a periphery of the component to hermetically seal the A-surface edge.

3. The component as claimed in claim 2, wherein an end face of one of the layers is bonded to the other one of the layers.

4. The component as claimed in claim 1, wherein the core is a cellular core.

5. The component as claimed in claim 4, wherein the cellular core is a honeycomb core.

6. The component as claimed in claim 1, wherein the first outer layer and the second outer layer are reinforced thermoplastic layers.

7. The component as claimed in claim 6, wherein each of the layers is fiber reinforced.

8. The component as claimed in claim 6, wherein the core is a thermoplastic core and wherein the thermoplastic of the layers and the core is polypropylene.

9. The component as claimed in claim 1, wherein the component has a thickness in the range of 5 to 25 mm.

10. The component as claimed in claim 1, wherein at least one of the layers is a woven layer.

11. An assembly comprising:
    a component having a bottom layer and an outer peripheral side wall; and
    a sandwich-type, composite motor vehicle component having a sealed, moisture-resistant, A-surface edge, the component including:
        a first reinforced thermoplastic skin having an A-surface to display in an interior of the vehicle;
        a second reinforced thermoplastic skin having a B-surface; and
        a thermoplastic cellular core positioned between the first skin and the second skin and having a plurality of cavities wherein the skins are bonded to the core by press molding, and wherein an outer peripheral edge portion of the component is locally crushed by the press molding so that the skins are bonded together to form the sealed, moisture-resistant, A-surface edge for display in the interior of the vehicle and wherein the outer peripheral side wall is spaced inwardly from the outer peripheral edge portion.

12. The component as claimed in claim 11, wherein the skins are chemically bonded together at the periphery of the component to hermetically seal the A-surface edge.

13. The component as claimed in claim 12, wherein an end face of one of the skins is bonded to the other one of the skins.

14. The component as claimed in claim 11, wherein the skins are reinforced thermoplastic skins.

15. The component as claimed in claim 14, wherein each of the skins is fiber reinforced.

16. The component as claimed in claim 11, wherein the cellular core is a honeycomb core.

17. A unitary structural assembly comprising:
    a component having a bottom layer and an outer peripheral side wall; and
    a sandwich-type, composite panel having a sealed, moisture-resistant, A-surface edge, the panel including:
        a first outer layer bonded to a lower surface of the bottom layer;
        a second outer layer; and
        a core positioned between the first outer layer and the second outer layer and having a plurality of cavities wherein the outer layers are bonded to the core by press molding, and wherein an outer peripheral edge portion of the panel is locally crushed by the press molding so that the outer layers are bonded together to form the sealed, moisture-resistant, A-surface edge and wherein the outer peripheral side wall is spaced inwardly from the outer peripheral edge portion.

18. The assembly as claimed in claim 17, wherein the outer layers are chemically bonded together at the periphery of the panel to hermetically seal the A-surface edge.

19. The assembly as claimed in claim 18, wherein an end face of one of the outer layers is bonded to the other one of the outer layers.

20. The assembly as claimed in claim 17, wherein the side wall is hollow.

* * * * *

UNITED STATES PATENT AND TRADEMARK OFFICE
CERTIFICATE OF CORRECTION

| | | |
|---|---|---|
| PATENT NO. | : 8,883,285 B2 | Page 1 of 1 |
| APPLICATION NO. | : 13/687232 | |
| DATED | : November 11, 2014 | |
| INVENTOR(S) | : Darius J. Preisler et al. | |

It is certified that error appears in the above-identified patent and that said Letters Patent is hereby corrected as shown below:

In the Claims,

Column 7, Line 28, Claim 1:

After "second"
Delete "out" and
Insert -- outer --.

Signed and Sealed this
Nineteenth Day of May, 2015

Michelle K. Lee
*Director of the United States Patent and Trademark Office*